(12) United States Patent  
Stevenson et al.

(10) Patent No.: US 8,233,020 B2  
(45) Date of Patent: Jul. 31, 2012

(54) ENHANCED IMAGING OF FEATURES

(75) Inventors: Sylvia H. Stevenson, Wilmington, DE (US); Valentin Karasyuk, Vancouver (CA)

(73) Assignee: Kodak Graphic Communications Canada Company, Burnaby (CA)

( * ) Notice: Subject to any disclaimer, the term of this patent is extended or adjusted under 35 U.S.C. 154(b) by 580 days.

(21) Appl. No.: 12/307,845

(22) PCT Filed: Jul. 11, 2007

(86) PCT No.: PCT/IB2007/001961  
§ 371 (c)(1),  
(2), (4) Date: Oct. 29, 2009

(87) PCT Pub. No.: WO2008/015515  
PCT Pub. Date: Feb. 7, 2008

(65) Prior Publication Data  
US 2010/0047701 A1 Feb. 25, 2010

Related U.S. Application Data

(60) Provisional application No. 60/820,738, filed on Jul. 28, 2006.

(51) Int. Cl.  
*B41J 2/47* (2006.01)  
*B41J 2/447* (2006.01)

(52) U.S. Cl. .................................... 347/240

(58) Field of Classification Search .......... 347/224, 347/225, 233, 240, 251, 253  
See application file for complete search history.

(56) References Cited

U.S. PATENT DOCUMENTS

| | | | | |
|---|---|---|---|---|
| 5,164,742 A * | 11/1992 | Baek et al. | ..... | 347/234 |
| 5,278,578 A * | 1/1994 | Baek et al. | ..... | 347/240 |
| 5,517,359 A | 5/1996 | Gelbart | | |
| 5,808,655 A * | 9/1998 | Haas et al. | ..... | 347/234 |
| 6,242,140 B1 | 6/2001 | Kwon et al. | | |
| 6,618,158 B1 | 9/2003 | Brown et al. | | |
| 6,957,773 B2 | 10/2005 | Gelbart | | |
| 2009/0309954 A1 * | 12/2009 | Sirton et al. | ..... | 347/248 |
| 2010/0039490 A1 * | 2/2010 | Sirton | ..... | 347/251 |

FOREIGN PATENT DOCUMENTS  
EP  434 449  6/1991

* cited by examiner

*Primary Examiner* — Huan Tran  
(74) *Attorney, Agent, or Firm* — Nelson Adrian Blish

(57) ABSTRACT

Methods for imaging patterns of features by thermal transfer involve controlling intensities of a plurality of beams. The intensities of beams that image edge portions of a feature may be set to be different from the intensities of beams that image interior portions of the feature. Beams that image home and away edges of a feature may be controlled to have different intensities. Apparatus for imaging patterns of features may comprise a controller configured to maintain intensity information for channels of a multi-channel imaging head. The controller uses the intensity information to set intensities of those channels that correspond to edge portions of features being imaged in a current swath of the imaging head.

29 Claims, 12 Drawing Sheets

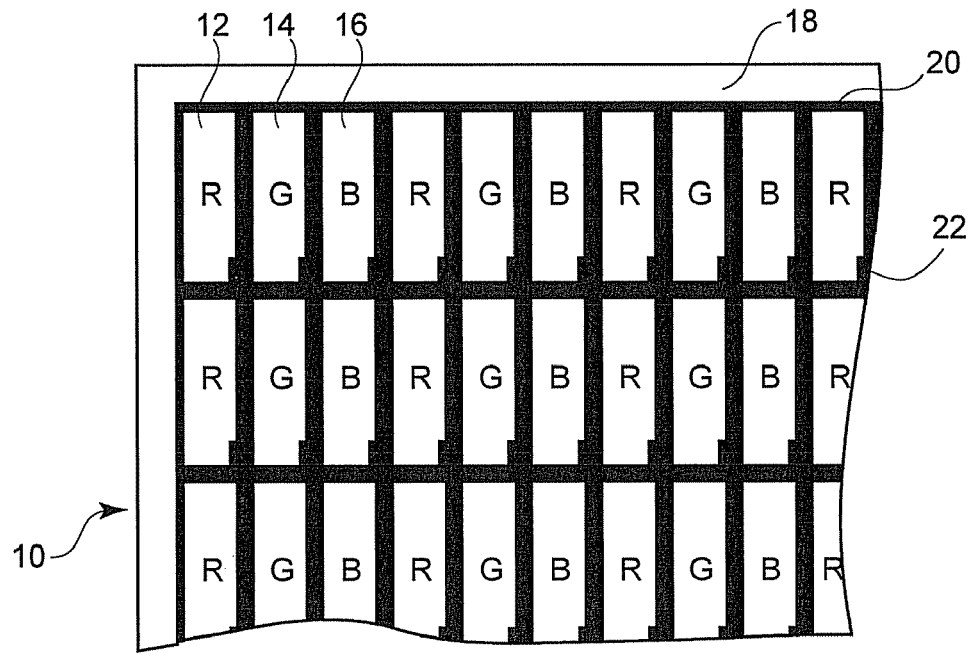
FIG. 1-A
PRIOR ART
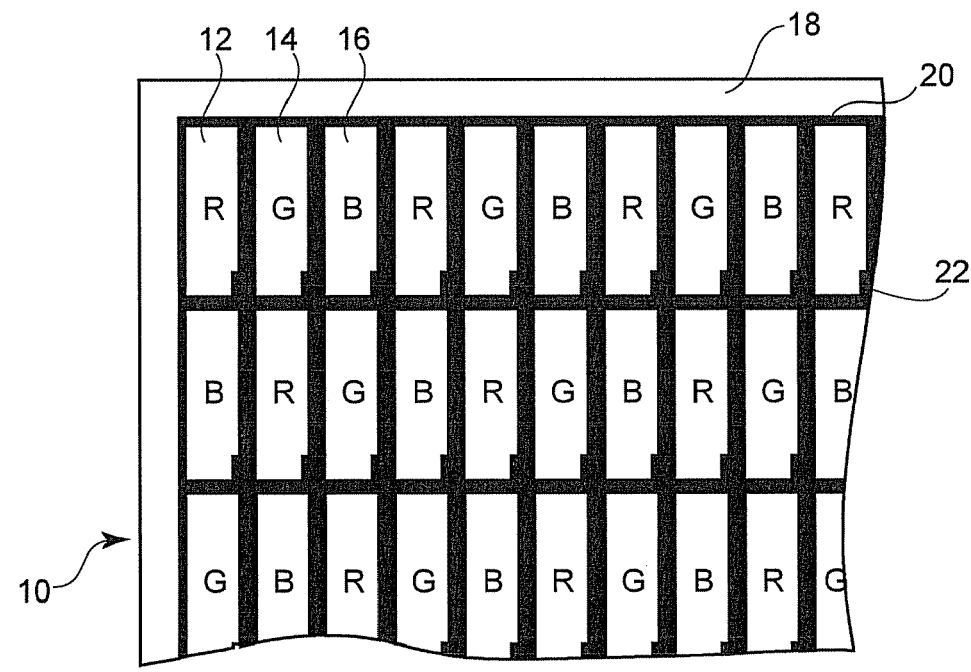
FIG. 1-B
PRIOR ART

ENHANCED IMAGING OF FEATURES

RELATED APPLICATIONS

This application claims priority to U.S. Provisional Application No. 60/820,738 entitled METHODS AND APPARATUS FOR ENHANCED IMAGING OF PATTERNS filed Jul. 28, 2006.

TECHNICAL FIELD

The invention relates to imaging systems and to methods for imaging features and patterns of features. The invention may be applied to fabricating color filters for electronic displays, for example.

BACKGROUND OF THE INVENTION

Common techniques for making displays and semiconductor electronic devices involve several imaging steps. Typically, in each step, a substrate coated with a resist or other sensitive material is exposed to radiation through a photo-tool mask to effect some change. Each step has a finite risk of failure. The possibility of failure at each step reduces the overall process yield and increases the cost of the finished article.

A specific example is the fabrication of color filters for flat panel displays such as liquid crystal displays. Color filter fabrication can be a very expensive process because of the high cost of materials and typically low process yield. Traditional photolithographic processing involves applying color resist materials to a substrate using a coating technique such as spin coating, slit and spin or spin-less coating. The material is then exposed via a photo-tool mask and developed.

Laser-induced thermal transfer processes have been proposed for use in the fabrication of displays, and in particular color filters. In such processes, a color filter substrate also known as a receiver element is overlaid with a donor element that is then image-wise exposed to selectively transfer a colorant from the donor element to the receiver element. Preferred exposure methods use laser beams to induce the transfer of the colorant to the receiver element. Diode lasers are particularly preferred for their ease of modulation, low cost and small size.

Laser induced "thermal transfer" processes include: laser induced "dye transfer" processes, laser-induced "melt transfer" processes, laser-induced "ablation transfer" processes, and laser-induced "mass transfer" processes. Colorants transferred during laser-induced thermal transfer processes include suitable dye-based or pigment-based compositions. Additional elements such as one or more binders may be transferred.

Conventional direct imaging systems have employed a limited number of imaging beams. Conventional direct imaging systems have also employed beams having a Gaussian intensity distribution. U.S. Pat. No. 6,242,140 to Kwon et al. describes the use of a laser beam with a uniform energy distribution, or a laser beam which scans by dithering. Other conventional systems have employed hundreds of individually-modulated beams in parallel to reduce the time taken to complete images. Imaging heads with large numbers of such "channels" are readily available. For example, a SQUAREspot® model thermal imaging head manufactured by Kodak Graphic Communications Canada Company, British Columbia, Canada has several hundred independent channels. Each channel can have power in excess of 25 mW. The array of imaging channels can be controlled to write an image in a series of swaths which are closely abutted to form a continuous image.

Even very small variations in the output radiation conditions incident upon the imaged media can cause imaging artifacts, such as banding and rough edges, in laser-induced thermal transfer processes. Variations in the output radiation emitted by the array of imaging channels may originate from channel-to-channel variations of power, beam size, beam shape, focus and beam coherence. Artifacts may not be solely attributable to the imaging system. The imaged media itself may also contribute to banding and other imaging artifacts.

Some prior art multi-channel imaging systems apply calibration methods that adjust the radiation output of all channels in an imaging array to be equal. Other calibration methods operate all channels of an imaging head at once to image a swath and attempt to establish uniformity in recorded optical properties across the swath by adjusting the outputs of channels in the array. EP 434,449A2 and U.S. Pat. No. 6,618,158 describe methods for establishing a uniform power distribution across a multi-channel imaging array or reducing variations between channels of an imaging array.

Image quality is especially important in the production of color filters. Color filters typically have a repeating pattern of spaced-apart color elements (the elements are usually of three colors such as red green and blue). Since the color elements form a repeating pattern, any periodic variations introduced by an imaging process can lead to a visual beating perceptible to the human eye. Rough edges along the boundaries of color elements can lead to colorless voids that further adversely impact the quality of the color filter.

There remains a need for cost effective and practical imaging methods and systems that permit making high-quality images of patterns of features. There remains a need for imaging methods that lessen the visibility of imaging artifacts associated with the imaging of repeating patterns of features, such as the patterns of color elements in a color filter, with a multi-channel imaging head.

SUMMARY OF THE INVENTION

One aspect of the invention provides a method for imaging a feature by laser-induced thermal transfer. The method comprises scanning a plurality of independently-controllable light beams in a scan direction along corresponding scan lines on a substrate comprising a donor element and a receiver element. The method images a feature by operating a contiguous group of the beams to transfer a material from the donor element to the receiver element; and, while imaging the feature, controls intensities of a first edge sub-group of one or more of the beams corresponding to a first portion of the feature extending along a first edge of the feature and a second edge sub-group of one or more of the beams corresponding to a second portion of the feature extending along a second edge of the feature to have intensities different from those of an interior sub-group of one or more of the beams corresponding to an interior portion of the feature.

In some example embodiments of the invention the light beams are generated by a multi-channel imaging head. The light beams are not necessarily visible light beams but may be infrared beams, visible beams or beams in some other suitable wavelength range. Multiple features may be imaged during one scan of the multi-channel imaging head. In some embodiments, the beams provide an intensity profile that is asymmetrical.

Some example embodiments of the invention have one or more of the following characteristics:

a plurality of features are imaged during one scan of the multi-channel imaging head and the imaging head is controlled such that a home edge of a first feature is imaged by light beams having intensities that are different from the intensities of light beams used to image a home edge of a second feature;

a plurality of features are imaged during one scan of the multi-channel imaging head and the imaging head is controlled such that an away edge of a first feature is imaged by light beams having intensities that are different from the intensities of light beams used to image an away edge of a second feature;

a plurality of features are imaged and a plurality of beams used to image one of the features provide an intensity profile that is different from an intensity profile provided by the beams that are used to image another one of the features;

a feature is imaged with intensity profiles that are asymmetrical with respect to the feature;

first and second features are imaged with first and second intensity profiles that differ from one another.

Other aspects of the invention provide program products for imaging patterns of features.

Further aspects of the invention and features of embodiments of the invention are described herein.

BRIEF DESCRIPTION OF THE DRAWINGS

Embodiments and applications of the invention are illustrated by the attached non-limiting drawings. The attached drawings are for purposes of illustrating the concepts of the invention and may not be to scale.

FIG. 1A is a plan view of a portion of a prior art color filter.

FIG. 1B is a plan view of a portion of another prior art color filter.

Figure 2:
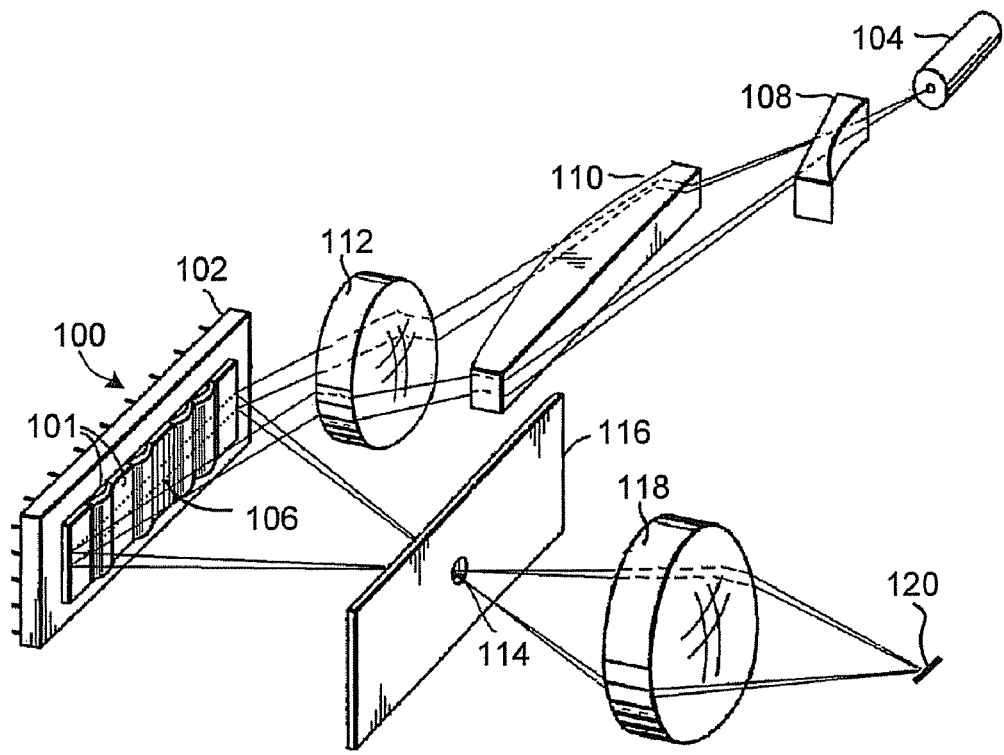
FIG. 2 is a partially schematic perspective view of the optical system of an example prior art multi-channel imaging head.

LIST OF REFERENCE NUMERALS 10 color filter
12 (red) color element
12' (red) color element
14 (green) color element
14' (green) color element
16 (blue) color element
16' (blue) color element
18 receiver element
20 black matrix
22 areas
24 donor element
26 multi-channel imaging head
30 red stripe
32 red stripe
34 stripe
34' portion
34" portion
36 red stripe
38 first position
38' new position
40 individually addressable imaging channels
41 broken lines
42 main-scan direction
44 sub-scan direction
45 last channel
46 first channel
47 edge discontinuity
48 channel group
48' channel group
49 edge discontinuity
50 pattern of features
51 feature
52' interior portion
54 channel subgroup
54' first edge channel sub-group
54" second edge channel sub-group
56' home outer edge
56" away outer edge
57 intensity profile
58 interior channel group
60 un-imaged areas
100 linear light valve array
101 deformable mirror elements
102 semiconductor substrate
104 laser
106 illumination line
108 cylindrical lens
110 cylindrical lens
112 lens
114 aperture
116 aperture stop
118 lens
120 image-wise modulated beam
200 system
212 imageable media
220 translation unit
230 systems controller
232 intensity information
240 data
250 program product

DETAILED DESCRIPTION

Throughout the following description specific details are presented to provide a more thorough understanding to persons skilled in the art. However, well-known elements may not have been shown or described in detail to avoid unnecessarily obscuring the disclosure. Accordingly, the description and drawings are to be regarded in an illustrative, rather than a restrictive, sense.

Color filters used in display panels typically include a matrix comprising a plurality of color elements. The color elements may include patterns of red, green and/or blue color elements, for example. Color filters may be made with color elements of other colors. The color elements may be arranged in any of various suitable configurations. Prior art stripe configurations have alternating columns of red, green and blue color elements as shown in FIG. 1A. Prior art mosaic configurations have the color elements that alternate in both directions (e.g. along columns and rows) as shown in FIG. 1B. Prior art delta configurations (not-shown) have groups of red, green and blue color elements arranged in a triangular relationship to each other. Color filters may have other configurations.

FIG. 1A shows a portion of a prior art "stripe configuration" color filter 10 having a plurality of red, green and blue color elements 12, 14 and 16 respectively formed in alternating columns across a receiver element 18. Color elements 12, 14 and 16 are outlined by portions of a black matrix 20. Matrix 20 can reduce leakage of backlight between the elements. The columns are commonly imaged in elongate stripes that are subdivided by matrix 20 into individual color elements 12, 14 and 16. TFT transistors on the associated LCD panel (not shown) may be masked by areas 22 of matrix 20.

FIG. 1B shows a portion of a prior art color filter 10 arranged in a mosaic configuration in which color elements 12, 14 and 16 are arranged in columns and alternate both across and along the columns Each of color elements 12, 14 and 16 may overlap adjoining portions of matrix 20. Overlapping the color elements with matrix 20 is a way to reduce the precision with which the color elements must be registered with matrix 20. Color elements may be applied by laser-induced thermal transfer processes. Laser-induced thermal transfer processes include the image-wise transfer of one or more image-forming materials. Image-forming materials may comprise, without limitation, dyes or other suitable image-forming materials, such as pigments and other colorant compositions. Laser-induced thermal transfer processes include processes which use laser radiation to cause the transfer of a colorant with or without a binder. Non-limiting examples of laser-induced thermal transfer processes include laser induced "dye transfer" processes, laser-induced "melt transfer" processes, laser-induced "ablation transfer" processes, and laser-induced "mass transfer" processes.

Figure 3:
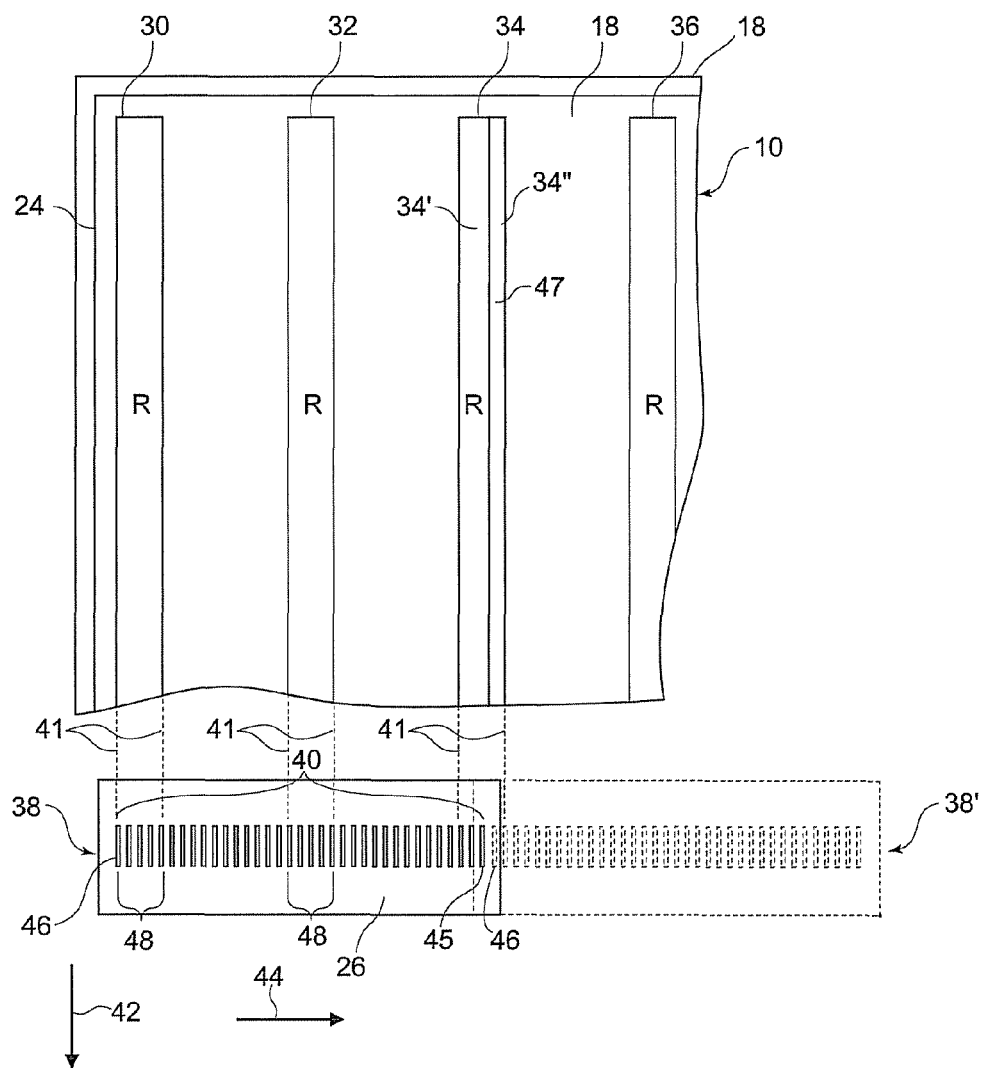
FIG. 3 is a schematic view of a multi-channel head imaging a pattern of non-contiguous features onto an imageable media.

FIG. 3 shows a conventional laser-induced thermal transfer process being used to fabricate a color filter 10. A multi-channel imaging head 26 is being used to transfer image-forming material from a donor element 24 to an underlying receiver element 18. Receiver element 18 typically has a matrix 20 (not shown) formed on it. Although a thermal transfer process could be used to form a matrix 20 on receiver element 18, matrix 20 is typically formed by lithographic techniques.

Donor element 24 includes an image-forming material (not shown) that can be image-wise transferred onto the receiver element 18 when radiation emitted by multi-channel imaging head 26 is scanned across donor element 24. Red, green and blue portions of filter 10 are typically imaged in separate imaging steps, each imaging step using a different color donor element appropriate for the color to be imaged. The red, green and blue elements of the filter are typically transferred to receiver element 18 such that the color elements are each in register with a corresponding opening in matrix 20. Each donor element 24 is removed upon completion of the corresponding imaging step. After the color elements have been transferred, the imaged color filter may be subjected to one or more additional process steps, such as annealing step for example, to change one or more physical properties (e.g. hardness) of the imaged color elements.

An example of a conventional laser-based multi-channel imaging head that employs a spatial light modulator or light valve to create a plurality of imaging channels is shown schematically in FIG. 2. In the illustrated example, linear light valve array 100 includes a plurality of deformable mirror elements 101 fabricated on a semi-conductor substrate 102. Mirror elements 101 are individually addressable. Mirror elements 101 can be micro-electro-mechanical (MEMS) elements, such as deformable mirror micro-elements, for example. A laser 104 can generate an illumination line 106 on light valve 100 using an anamorphic beam expander comprising cylindrical lenses 108 and 110. Illumination line 106 is laterally spread across the plurality of elements 101 so that each of the mirror elements 101 is illuminated by a portion of illumination line 106. U.S. Pat. No. 5,517,359 to Gelbart describes a method for forming an illumination line.

A lens 112 typically focuses laser illumination through an aperture 114 in an aperture stop 116 when elements 101 are in their un-actuated state. Light from actuated elements is blocked by aperture stop 116. A lens 118 images light valve 100 to form a plurality of individual image-wise modulated beams 120, which can be scanned over the area of a substrate to form an imaged swath. Each of the beams is controlled by one of the elements 101. Each of the beams is operable for imaging, or not imaging, an "image pixel" on the imaged substrate in accordance with the driven state of the corresponding element 101. Each of elements 101 controls one channel of a multi-channel imaging head.

Referring again to FIG. 3, the receiver element 18, or the image of the multi-channel imaging head 26, or a combination of both, are displaced relative to one another while the channels of the imaging head 26 are controlled in response to image data to create imaged swaths. In some embodiments the image of imaging head 26 is stationary and receiver element 18 is moved. In other embodiments receiver element 18 is stationary and the image of imaging head 26 is moved. In still other embodiments, both imaging head 26 and the receiver element 18 are moved to produce the desired relative motion between imaging head 26 and receiver element 18 along one or more scan paths.

Any suitable mechanism may be applied to move imaging head 26 over a receiver element 18. Flat bed imagers are typically used for imaging receiver elements 18 that are relatively rigid, as is common in fabricating display panels. A flat bed imager has a support that secures a receiver element 18 in a flat orientation. U.S. Pat. No. 6,957,773 to Gelbart describes a high-speed flatbed imager suitable for display panel imaging. Alternatively, flexible receiver elements 18 may be secured to either an external or internal surface of a "drum-type" support to effect the imaging of the swaths. Even a receiver element that is traditionally thought of as rigid, such as glass, may be imaged on a drum-based imager provided that the substrate is sufficiently thin and the diameter of the support is sufficiently large.

FIG. 3 shows a portion of a color filter receiver element 18 that has been patterned with a plurality of red stripes 30, 32, 34 and 36 in a laser-induced thermal transfer process. In this process, a donor element 24 positioned on receiver element 18 and areas corresponding to the plurality of red stripes 30, 32, 34 and 36 are imaged on receiver element 18. This results in the transfer of the image-forming material from donor element 24 onto receiver element 18 to form stripes 30, 32, 34 and 36. In FIG. 3, donor element 24 is shown as being smaller than receiver element 18 for the purposes of clarity only. Donor element 24 may overlap one or more portions of receiver element 18 as may be required.

Each set of color filter elements constitutes a pattern of features. In this case, the features are non-contiguous. Stripes 30, 32, 34 and 36 are an example of a pattern of such non-contiguous features. Stripes 30, 32, 34 and 36 are spatially separated from one another along sub-scan direction 44. Multi-channel imaging head 26 includes a plurality of individually-addressable imaging channels 40. In FIG. 3, imaging head 26 is located in a first position 38. FIG. 3 depicts the correspondence between imaging channels 40 and the transferred pattern as broken lines 41. Features, such as stripes 30, 32, 34 and 36 generally have dimensions in sub-scan direction 44 that are greater than the widths of pixels imaged by imaging channels 40. Such features may be imaged by turning on a group of channels that spans the width of the feature in sub-scan direction 44 while scanning the channels in a direction 42 along a scan path.

While multi-channel imaging head 26 is shown in FIG. 3 as being the same size as the imaged pattern, this is not necessary. The imaging beams emitted by imaging head 26 may be imaged by a suitable optical system which may modify the size and/or shape of the imaging swath at the plane of the substrate. The imaging beams generated by multi-channel imaging head 26 are scanned over receiver element 18 in a main-scan direction 42 while being image-wise modulated according to image data specifying the pattern of features to be written. Groups 48 of channels are driven appropriately to produce active imaging beams wherever it is desired to form a feature. Channels 40 not corresponding to the features are driven so as not to image corresponding areas.

Channels 40 of imaging head 26 can image a swath having a width related to the distance between a first pixel imaged by a first channel and a last pixel imaged by a last channel. Receiver element 18 is typically too large to be imaged within a single swath. Therefore, multiple scans of imaging head 26 are typically required to complete an image on receiver element 18.

Movement of multi-channel imaging head 26 in sub-scan direction 44 may occur after the imaging of each swath is completed in main scan direction 42. Alternatively, imaging head 26 may be translated relative to receiver element 18 along sub-scan direction 44 in synchrony with the main-scan motion in order to compensate for potential skew between the main-scan direction effected by the imaging system, and the desired placement of the image with respect to receiver element 18. Alternatively, with a drum-type imager, it may be possible to simultaneously move imaging head 26 in both the main-scan 42 and sub-scan directions 44, thus writing the image in swath extending helically on the drum. Those skilled in the art will appreciate that there are other possible patterns of relative movement between imaging head 26 and receiver element 18 that could be used to image the desired imaging area on receiver element 18.

There are several options for aligning different swaths including: overlapping adjacent swaths by one or more imaged pixel widths and spacing the first channel of a subsequently-imaged swath from the last channel of an adjacent previously-imaged swath by a distance related to a pitch distance between imaged pixels.

Referring back to FIG. 3, red stripes 30, 32 and portion 34' of stripe 34 are imaged during a first scan of imaging head 26. On completion of the first scan, imaging head 26 is displaced from first position 38 in the sub-scan direction 44 to a new position 38' (shown in broken lines). In new position 38', a first channel 46 of imaging head 26 is located adjacent to the previous position of last channel 45 of imaging head 26. In position 38', imaging head is scanned in main scan direction 42 thus imaging the remaining portion 34" of stripe 34. It is difficult to avoid the appearance of a visible discontinuity shown as line 47 at the boundary between portions 34' and 34" of stripe 34. This visible discontinuity between adjacent imaged swaths can cause one form of image artifact called banding.

Figure 4:
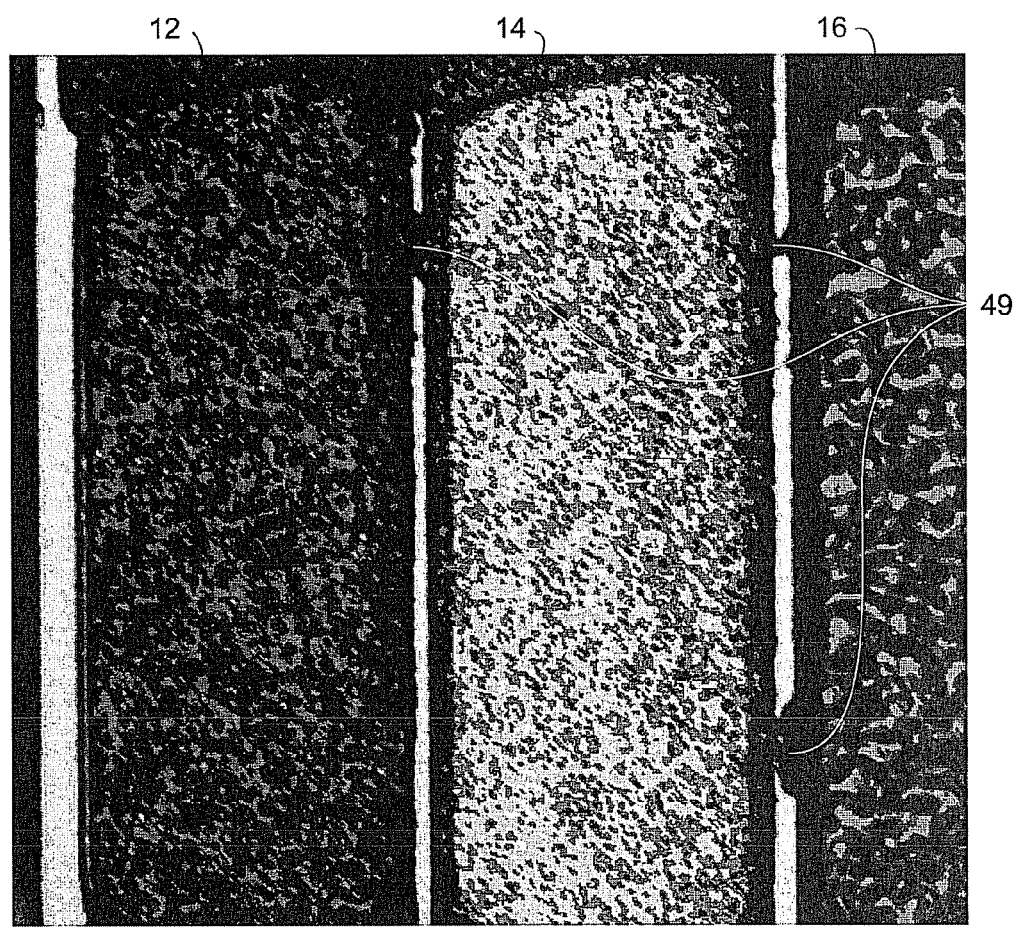
FIG. 4 is a photograph of edge discontinuities present in a color filer produced by a laser-induced thermal transfer process.

Banding may become more pronounced when a regular pattern of features is produced. The repeating nature of the pattern can lead to a beating effect that accentuates any banding created by density variation in the imaged features. Other imaging artifacts can also arise in laser-induced thermal transfer processes. For example, when a laser-induced thermal transfer process is used to image a pattern of features, such as the elements of a color filter, rough edges and various edge discontinuities can occur at the edges of the features. These edge discontinuities can occur for a number of reasons, such as, for example, small power variations in the output power of the imaging channels of the imaging head. Even small power variations can affect the amount of image-forming material that is transferred from a donor element to the receiver element, especially if the donor elements exhibit non-linear imaging properties. Differential thermal effects between the imaged outboard and inboard portions of the feature can lead to rough edges especially when the imaged feature is a non-contiguous feature that is separated from other features by non-imaged areas. Mechanical effects, such as insufficient peel strength associated with the image-forming material transferred to the edges of the features or insufficient control of peel speed, angle or direction, may lead to rough edges when the imaged donor element is peeled away. It may be possible to mask these edge artifacts by overlapping matrix 20 with the transferred image-forming material. However, image-forming material can shrink post annealing and expose edge discontinuities. FIG. 4 is a photograph of a portion of a color filter that has a red element 12, a green element 14 and a blue element 16. Edge discontinuities 49 can be observed between the three elements. Even edge discontinuities 49 that are quite small relative to elements 12, 14 and 16, can adversely impact the visual uniformity of the color filter as a whole, diminishing its quality. Edge discontinuities can include protrusions or notches in an edge of a feature.

Figure 5:
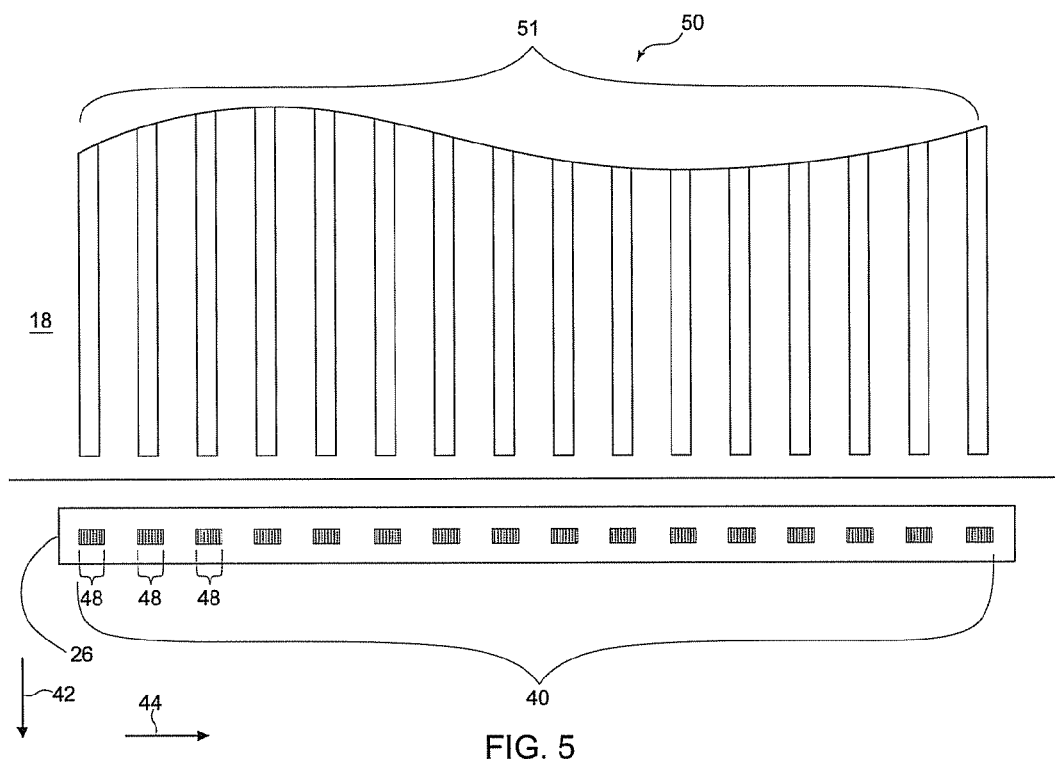
FIG. 5 is a schematic view of media imaged by a multi-channel imaging head in accordance with an aspect of the invention.

The present invention provides systems and methods in which the intensities of imaging beams are adjusted in ways that can yield enhanced results. FIG. 5 schematically depicts a portion of a receiver element 18 imaged in a laser-induced thermal transfer process according to one aspect of the invention. A repeating pattern 50 of features is imaged on a portion of receiver element 18. In the illustrated example, pattern 50 is made up of sixteen features 51. In this example, pattern 50 lies within a single swath imaged by imaging head 26. In other words, the pattern of features 50 is imaged in a single swath and is thus imageable during a single scan of imaging head 26.

Pattern 50 can form another portion of another pattern such as a color filter. For clarity, a color donor element 24 (which would be positioned on top of receiver element 18) is not shown in FIG. 5. The channels of imaging head 26 are controlled to transfer image-forming material from donor element 24 to receiver element 18. Subsequent scans may be performed. In these subsequent scans, other features may be imaged in the spaces between the features 51 shown in FIG. 5. The other features can include features of different colors. In the FIG. 5 example, each of features 51 comprises a stripe.

In this example, imaging head 26 has several hundred imaging channels 40. Each of features 51 is imaged by a group 48 of imaging channels 40. For clarity, imaging channels 40 are not shown individually in FIG. 5. In this example, each group 48 is made up of approximately twenty adjacently-positioned imaging channels 40. Each channel 40 is individually controllable. The channel 40 can be turned "on" to transfer image-forming material from donor element 24 to receiver element 18 along a scan line corresponding to the channel or may be turned "off" so that image-forming material is not transferred in the part of the corresponding scan line at which the channel is directed. For clarity, channels 40 that are turned "off" are not shown. The intensity of the beam produced when the channel 40 is "on" is also adjustable. Adjustment of intensity may comprise, for example, adjusting a power of the beam.

In one particular example, each individual imaging channel 40 may be capable of imaging pixels that are approximately 5 microns wide. Thus, each group 48 images a feature 51 that is approximately 100 microns wide (along sub-scan direction 44). Features 51 are spaced-apart in sub-scan direction 44 with a pitch of approximately 300 microns. In some embodiments of the invention, features are imaged with a laser-induced thermal transfer process in which the edge portions of the imaged features are enhanced to reduce edge discontinuities. Non-limiting examples of aspects of the invention will be described with reference to pattern 50 illustrated in FIG. 5.

Figure 6:
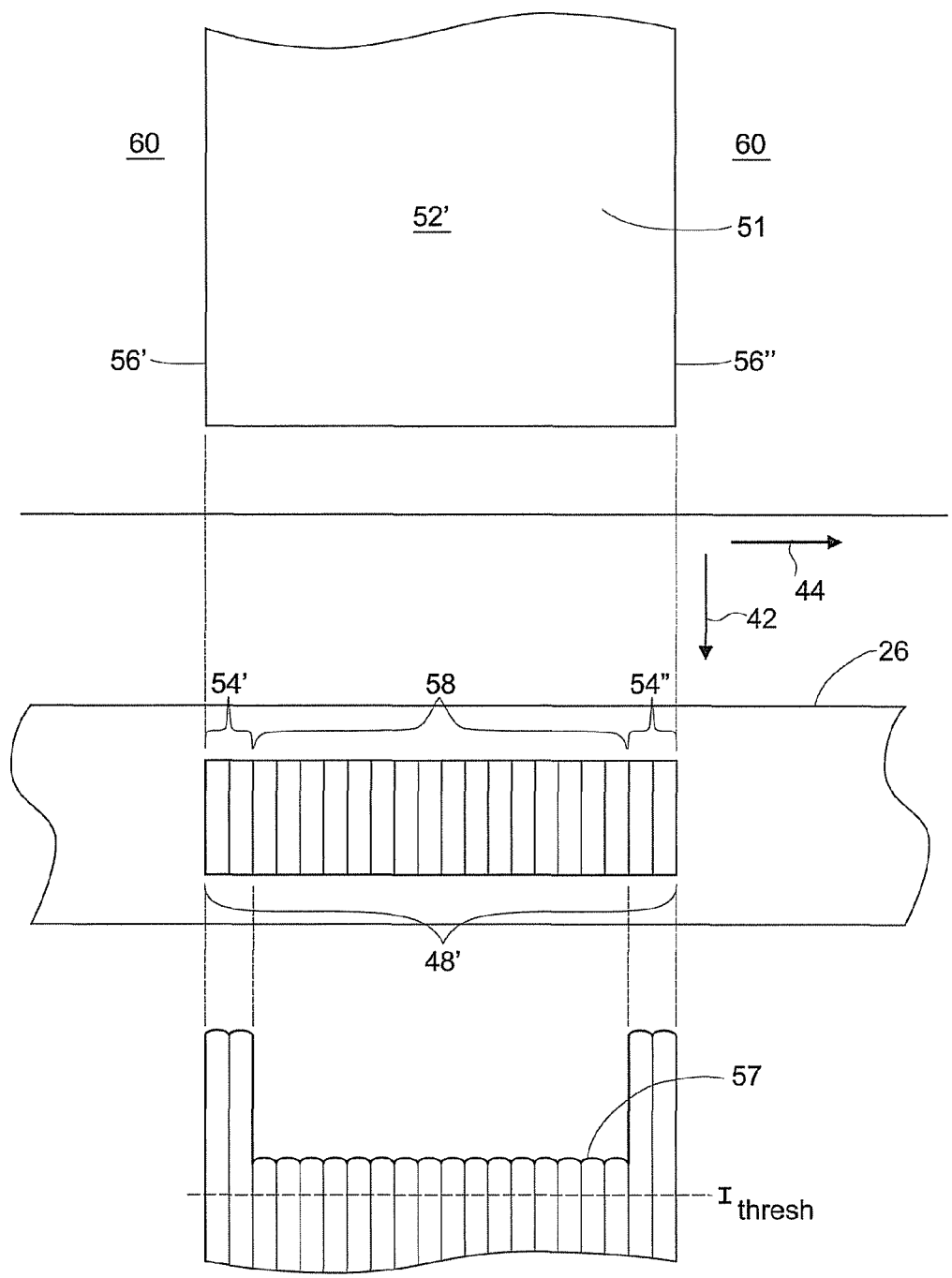
FIG. 6 is a detailed view of a portion of FIG. 5.

FIG. 6 is a detailed schematic view of a portion of the imaged media and one channel group 48 (referenced specifically as channel group 48') that is used to image a single feature 51. Each of the channels in group 48' is individually controllable to emit a beam of light. The intensities of the channels in group 49 are controlled to provide an intensity profile 57.

Edge channel sub-groups 54' and 54" (collectively, sub-group 54) are respectively associated with the imaging of areas lying along the edges 56' and 56" of feature 51. With reference to sub-scan direction 44, edge 56' may be referred to as the "home edge" while edge 56" can be referred to as the "away edge". Each edge channel sub-group 54 comprises one or more channels (two channels in the embodiment shown in FIG. 6). The number of channels to be included in each sub-group 54 may be determined based on factors such as the resolution of the channels, the number of channels in the channel group 48' and the media characteristics.

Exposure is defined in optics as the integral of light intensity over time. Many media respond to exposure. Exposure is related to an intensity of an imaging beam and an exposure time associated with the imaging beam. Exposure can be related to a scanning speed of the imaging beam. In some media, an image is formed when an exposure created by an imaging beam equals or exceeds an exposure threshold associated with the media. In some media, the exposure threshold depends on the intensity. In some media, a minimum intensity threshold must be equaled or exceeded in order to form an image. In FIG. 6, the intensities of all of the channels in group 48' are controlled to levels at or above ($I_{thresh}$) corresponding to the exposure threshold requirements of the media. The inboard or interior portion 52' of imaged feature 51 is imaged by channels of interior channel sub-group 58. Edge channel sub-groups 54 are controlled to generate light beams with intensities that are different from the intensities of the channels in interior sub-group 58. In this example, channels in sub-groups 54 are driven to provide higher intensities than are channels in interior sub-group 58. This produces increased exposure levels in edge areas extending along edges 56' and 56" of feature 51.

The increase in output of channels in edge sub-groups 54' and 54" produces an intensity gradient between the imaged areas at edges 56' and 56" and surrounding non-imaged areas 60 that is steeper than would be the case if all channels in group 48' were driven to produce the lower energy intensity levels associated with interior channels in sub-group 58.

Although they do not wish to be bound by a particular theory of operation, the inventors consider that this steeper intensity gradient results in a "cleaner" transfer of image-forming material to the receiver element in edge areas along edges 56' and 56" of feature 51.

In FIG. 6, the channels of sub-groups 54' and 54" are controlled to produce intensities that are substantially equal to one another. In some embodiments of the invention, the channels of sub-groups 54' and 54" are controlled to have different intensities.

Figure 6A:
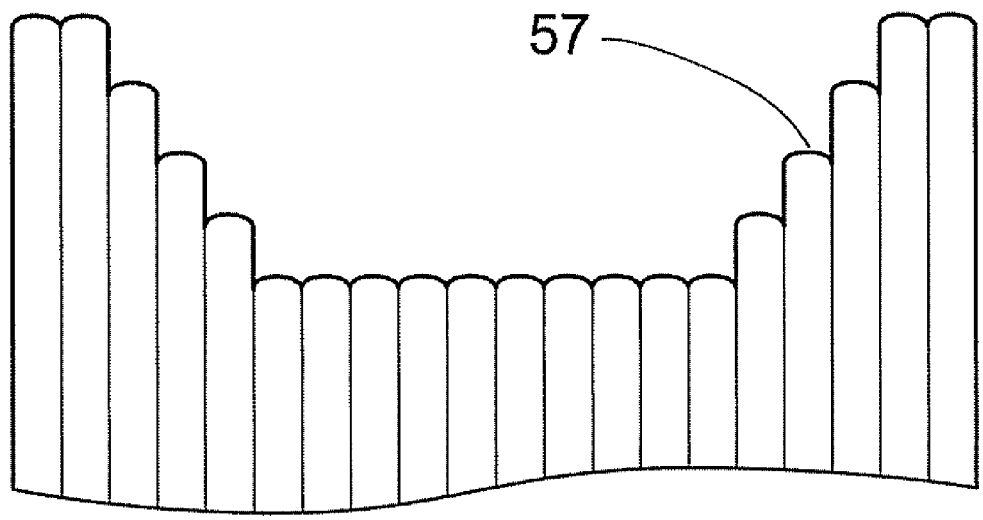
FIG. 6A is a symmetrical energy intensity profile as per an example embodiment of the invention.
Figure 6B:
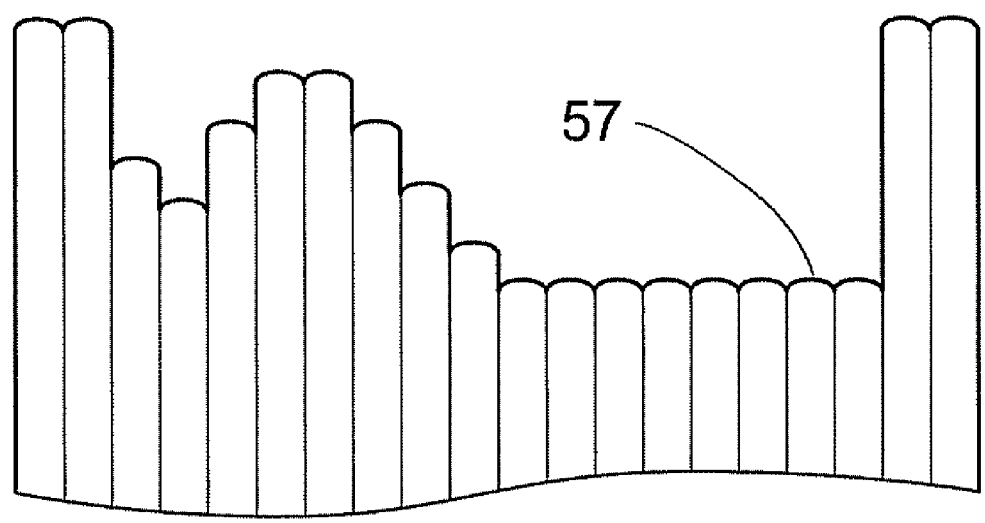
FIG. 6B is an asymmetrical energy intensity profile as per an example embodiment of the invention.

It is not necessary that all of the channels in any sub-group be controlled to have the same intensity. For example:

selected channels within either or both of edge channel sub-groups 54' and 54" may be controlled to have intensities different from those of other channels.

selected channels within interior channel sub-group 58 may be controlled to have intensities different from those of other channels.

selected channels within interior channel sub-group 58 may be controlled to have intensities that are higher or lower than the intensities of channels in either or both of edge channel sub-groups 54' and 54".

channels within interior sub-group 58 may be controlled to have a symmetrical intensity profile 57 as shown in FIG. 6A or an asymmetrical intensity profile 57 as shown in FIG. 6B. Intensity profiles 57 of other shapes may be provided within the scope of some aspects of the invention.

In some cases it is necessary or desirable to achieve a characteristic, such as optical density or color density of feature 51, within a desired range. By selectively boosting intensities of channels in sub-groups 54' and 54" one can preserve desired image characteristics while maintaining smoother edges. The intensity levels and distribution of channels in interior channel sub-group 58 may be controlled to achieve a desired overall density for feature 51.

The desired relationship between the intensity levels of channels in sub-groups 54' and 54" and channels in interior sub-group 58 may depend on various factors including, but not limited to:

the type of laser-induced thermal transfer media used (e.g. laser induced "dye transfer" media, laser-induced "melt transfer" media, laser-induced "ablation transfer" media, laser-induced "mass transfer" media, etc.);

the specific formulation of the media employed (e.g. different color formulations);

the donor-to-receiver element spacing which may vary as a function of matrix 20 thickness and/or the presence of image-forming material transferred to receiver element 18 during a preceding imaging of another donor element 24; and the characteristics of imaging head 26.

Figure 7:
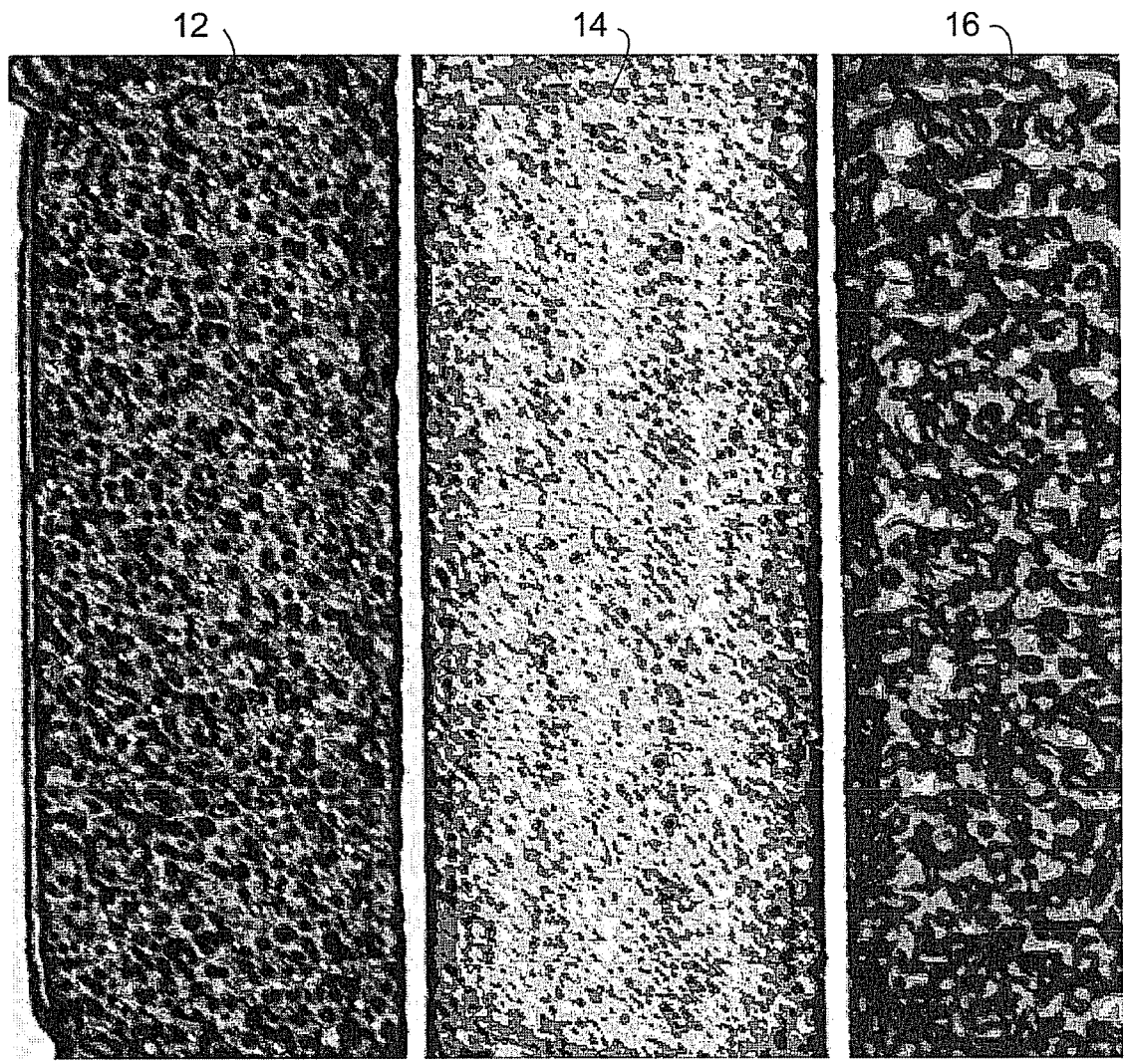
FIG. 7 is a photograph of a portion of a color filter produced according to an example embodiment of the invention.

FIG. 7 is a photograph of the a portion of a color filter including red color element 12, green color element 14 and blue color element 16 produced in accordance with an example embodiment of the invention. The imaging of each element was performed with a laser-induced thermal transfer process performed in a similar fashion to the methods described in reference to FIG. 6. Each element was produced in a separate imaging step, in which an appropriately-colored donor was imaged to produce one of the colored elements. A multi-channel imaging head 26 was employed in which groups 48 of approximately twenty channels were used to image each of the elements 12, 14, and 16. Each imaging channel produced pixels that were approximately 5 microns wide. Edge channel sub-groups 54' and 54" in each group 48 were used to image edges 56' and 56" of each feature.

In this example both edge channel sub-groups 54' and 54" were controlled to produce light beams having intensities approximately 12% greater than intensities of the light beams emitted by the channels of inboard sub-group 58 of each corresponding group 48. As shown in FIG. 7, each of the elements, 12, 14, and 16 have substantially smooth edges. The reduction in edge discontinuities as compared to FIG. 4 results in this portion of the color filter having improved visual characteristics.

Figure 8:
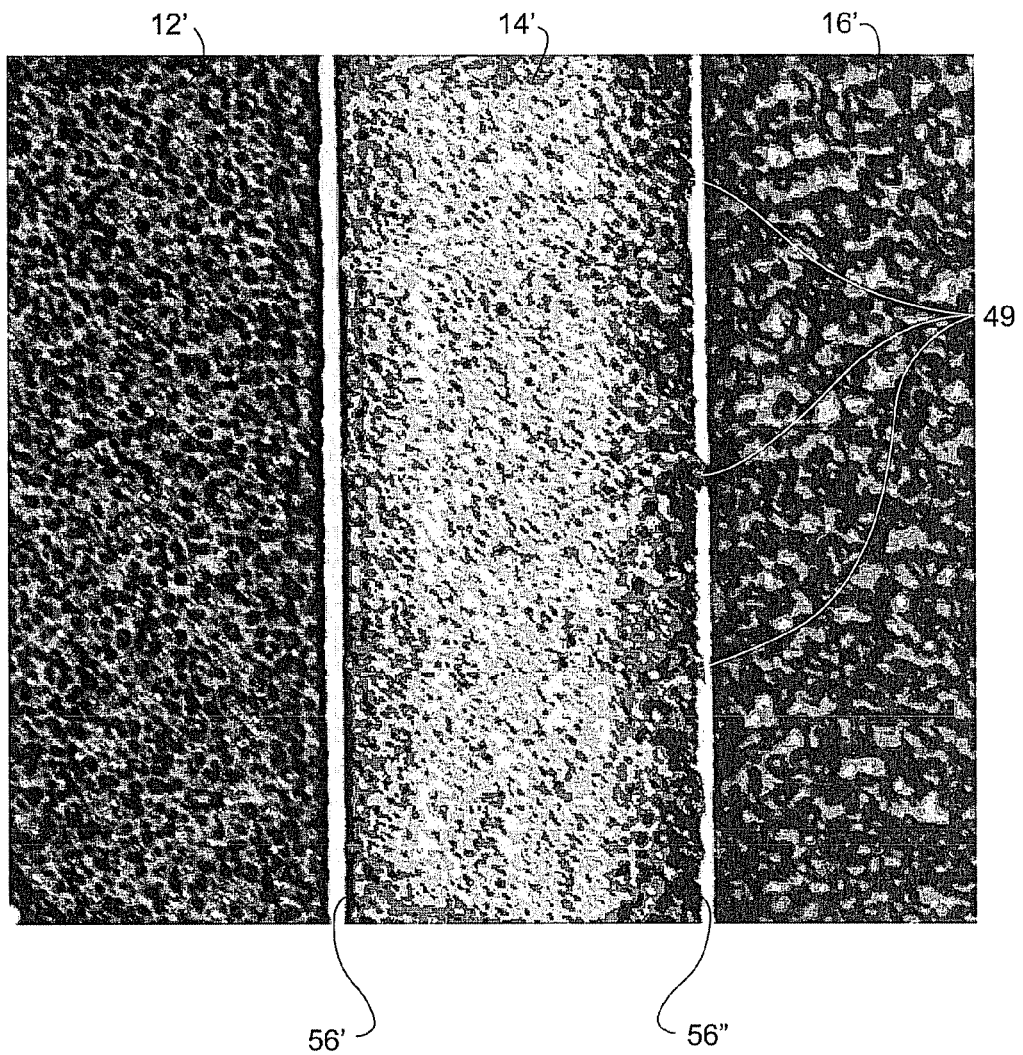
FIG. 8 is a photograph of another portion of the color filter shown in FIG. 7.

FIG. 8 is a photograph of a different portion of the same color filter shown in FIG. 7. FIG. 8 shows a red color element 12', a green color element 14' and a blue color element 16' produced as described above. Each of color elements 12', 14' and 16' was imaged at the same time and in the same swath as the corresponding one of elements 12, 14 and 16 shown in FIG. 7. Elements 12 and 12' were formed during a single scan of the imaging head over a red donor element; elements 13 and 13' were formed during a single scan of the imaging head over a green donor element; and elements 14 and 14' were formed during a single scan of the imaging head over a blue donor element. Each of elements 12', 14' and 16' was imaged with the same edge enhancement conditions used to image the corresponding one of elements 12, 14 and 16.

Some edge discontinuities 49 are present in the portion of the color filter shown in FIG. 8. In this example, edge discontinuities 49 appear to be predominant in green color element 14. Laser-induced thermal transfer media can have non-linear properties. In this example, exposure properties specific to the green donor may contribute to the formation of edge discontinuities 49. Other additional or alternative factors can contribute to the formation of edge discontinuities 49. In FIG. 8, the edge discontinuities 49 appear primarily on away edge 56" of element 14'. Home edge 56' of element 14' appears to be substantially free of discontinuities 49.

Figure 9A:
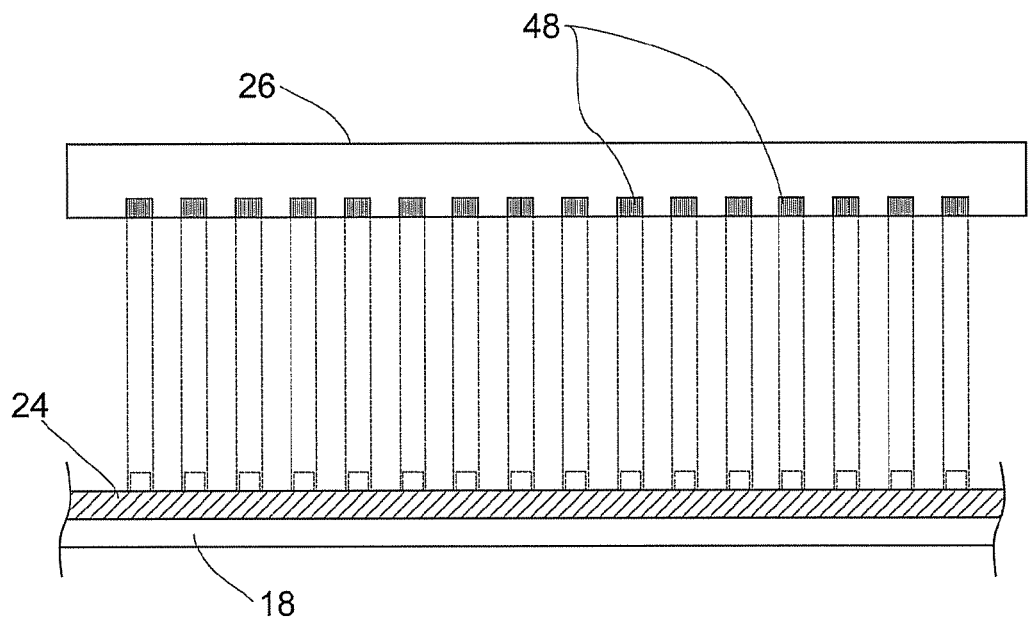
FIG. 9A is a cross-sectional view of the media of FIG. 5 prior to a transfer of image-forming material from the donor element to the receiver element.
Figure 9B:
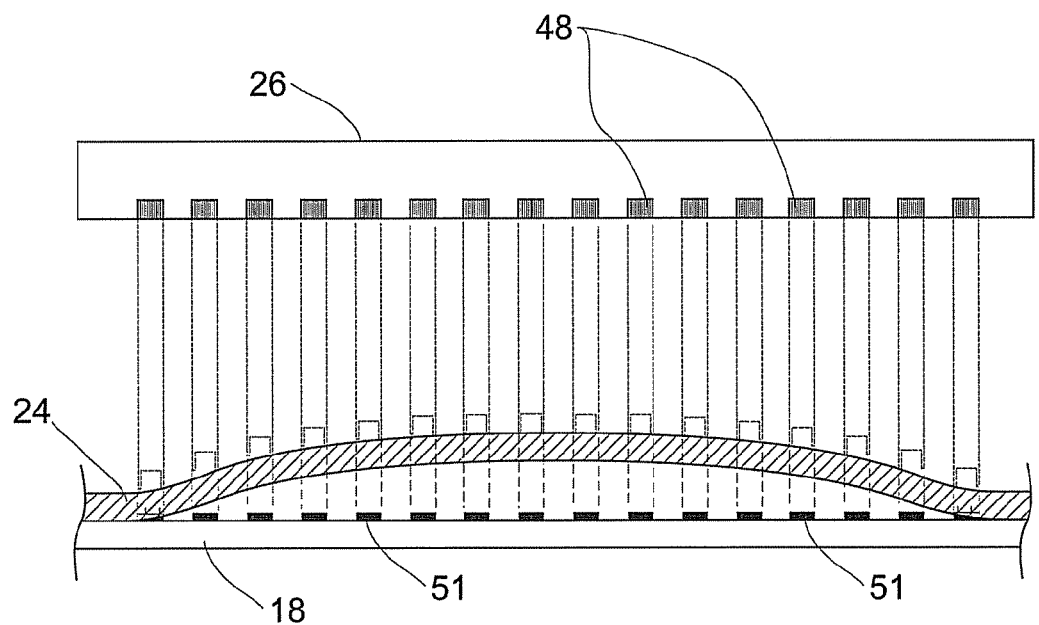
FIG. 9B is a cross-sectional view of the media of FIG. 5 during the transfer of image-forming material from the donor element to the receiver element.

FIGS. 9A and 9B illustrate a possible cause for this effect. FIG. 9A and FIG. 9B are partial schematic cross-sectional views of the system shown in FIG. 5 prior to the transfer of an image-forming material. Only those imaging channels 40 corresponding to channel groups 48 are shown in FIGS. 9A and 9B. During the imaging, donor element 24 is typically secured to receiver element 18 by some means which can include vacuum means. Matrix 20 is omitted for clarity. Matrix 20 typically has a distinct thickness. The securing means may cause donor element 24 to form into cavities in matrix 20.

The spacing between donor element 24 and receiver element 18 can affect the characteristics of material transferred to receiver element 18. Variations in the spacing can cause variations in the amount of image-forming material that is transferred from donor element 24 to receiver element 18. During the laser-induced thermal transfer imaging process, a portion of the image-forming material of the donor element 24 may not be transferred to the underlying receiver element, but rather, may undergo a phase change into a gaseous state.

FIG. 9B shows a deformation of donor element 24 that may arise due to a "gaseous bubble" between donor element 24 and the receiver element 18. The deformation of the donor element created by the imaging of a portion of donor element 24 may give rise to a variable donor-receiver element spacing across the swath. In this example, sixteen separate features 51 are being imaged. Each feature 51 may have a different donor-to-receiver element spacing.

As shown in FIG. 9B, various features 51 are subject to variable donor-to-receiver features. As shown in FIG. 9B, variable donor-to-receiver spacing can exist between the various features 51 as well as across a given feature 51. Factors such as variable donor-to-receiver spacing may require various features to be imaged differently than other features. One edge of a feature may be required to be imaged differently from another edge of the same feature. In some embodiments of the invention, edge sub-groups 54' and 54" of different features 51 may be operated at different intensities. In some embodiments of the invention, edge sub-groups 54' and 54" of the same feature 51 may be operated at different intensities.

Figure 10:
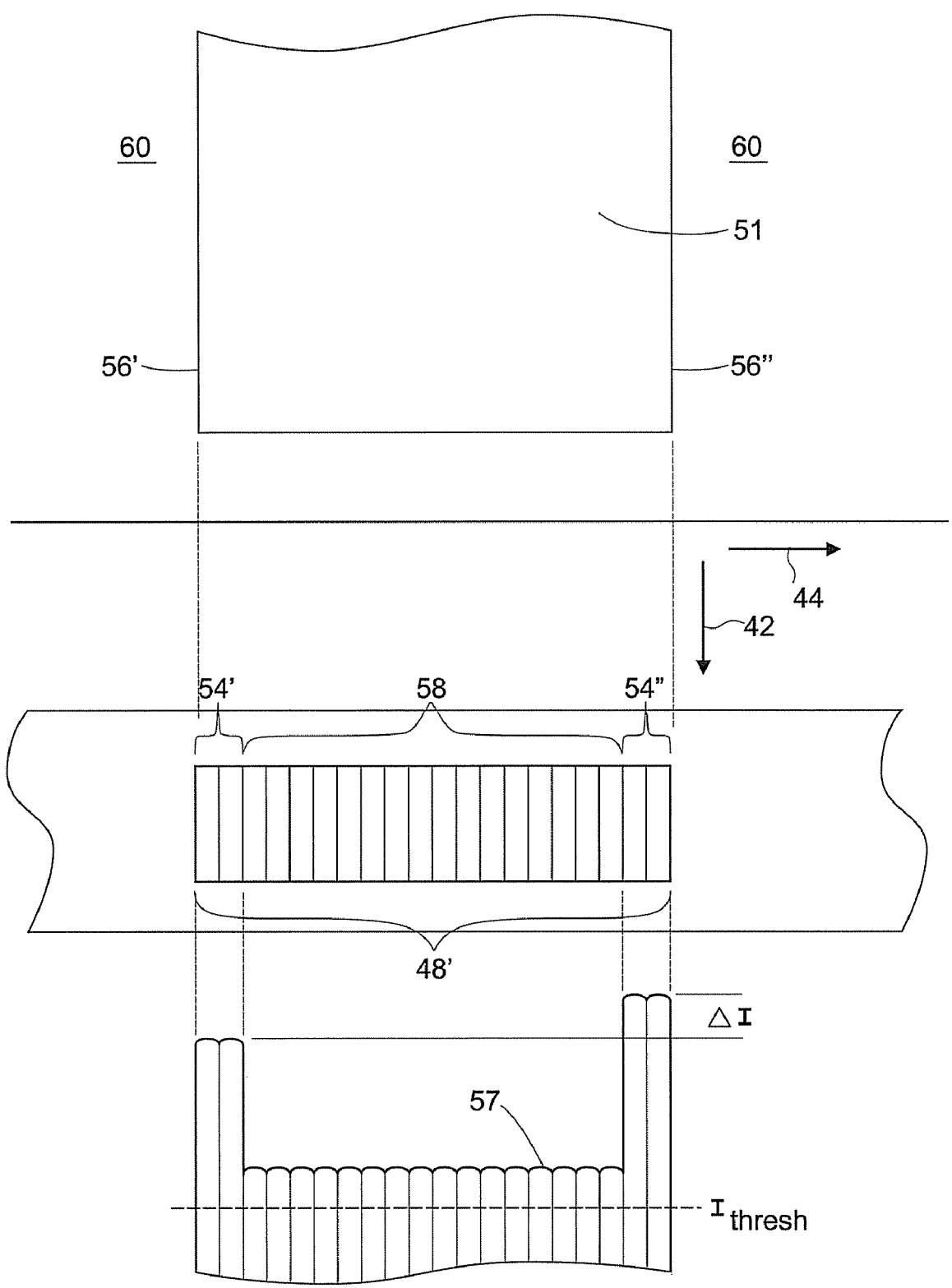
FIG. 10 is a schematic partial view of a media imaged by a multi-channel imaging head according to an example embodiment of the invention.

FIG. 10 shows a channel group 48' being used to image a single feature 51. An intensity profile 57 is also shown. Each of the channels in group 48' has an intensity that is controllable independently of other channels in group 48'. The intensity profile 57 of channel group 48' has been adjusted to reduce edge discontinuities in imaged feature 51. First edge channel sub-group 54' is responsible for imaging a first edge area extending along home edge 56'. Second edge channel sub-group 54" is responsible for imaging a second edge area extending along away edge 56". In this non-limiting example, each edge sub-group 54' and 54" includes two channels. In other example embodiments of the invention, edge sub-groups 54' and 54" include other suitable numbers of channels. In yet other example embodiments of the invention, edge sub-group 54' is made up of a different number of channels than edge sub-group 54".

In FIG. 10, both edge sub-groups 54' and 54" are controlled to generate light beams with intensity levels different from those of channels of interior sub-group 58. In the illustrated embodiment, both edge sub-groups 54' and 54" are controlled to provide higher intensity levels near edges 56' and 56" of feature 51 than are provided in the areas of feature 51 imaged by the channels of interior sub-group 58. Edge sub-group 54" is controlled to emit light beams with intensities higher than those of the light beams emitted by edge sub-group 54'. In the illustrated embodiment, the intensity corresponding to edge sub-group 54" differs from the intensity corresponding to edge sub-group 54' by an intensity difference $\Delta I$. This intensity difference results in intensity profile 57 being asymmetrical.

Asymmetrical intensity distributions may also be useful to reduce artifacts resulting from (or enhanced by) motion in sub-scan direction 44. In some embodiments relative motion between imaging head 26 and donor element 24 occurs in sub-scan direction 44 during the imaging of a feature 51. Such relative motion may cause first and second edges of the feature 51 to have different image characteristics. In such cases the artifacts may be reduced by imaging parts of feature 51 lying along edge 56' with a sub-group of channels 54' that produce beams having intensities different from beams in a sub-group 54" that image parts of feature 51 lying along second edge 56". In such cases, intensity profile 57 is asymmetrical.

In further example embodiments of the invention, different intensity profiles 57 are used to image different donor elements 24.

Figure 11:
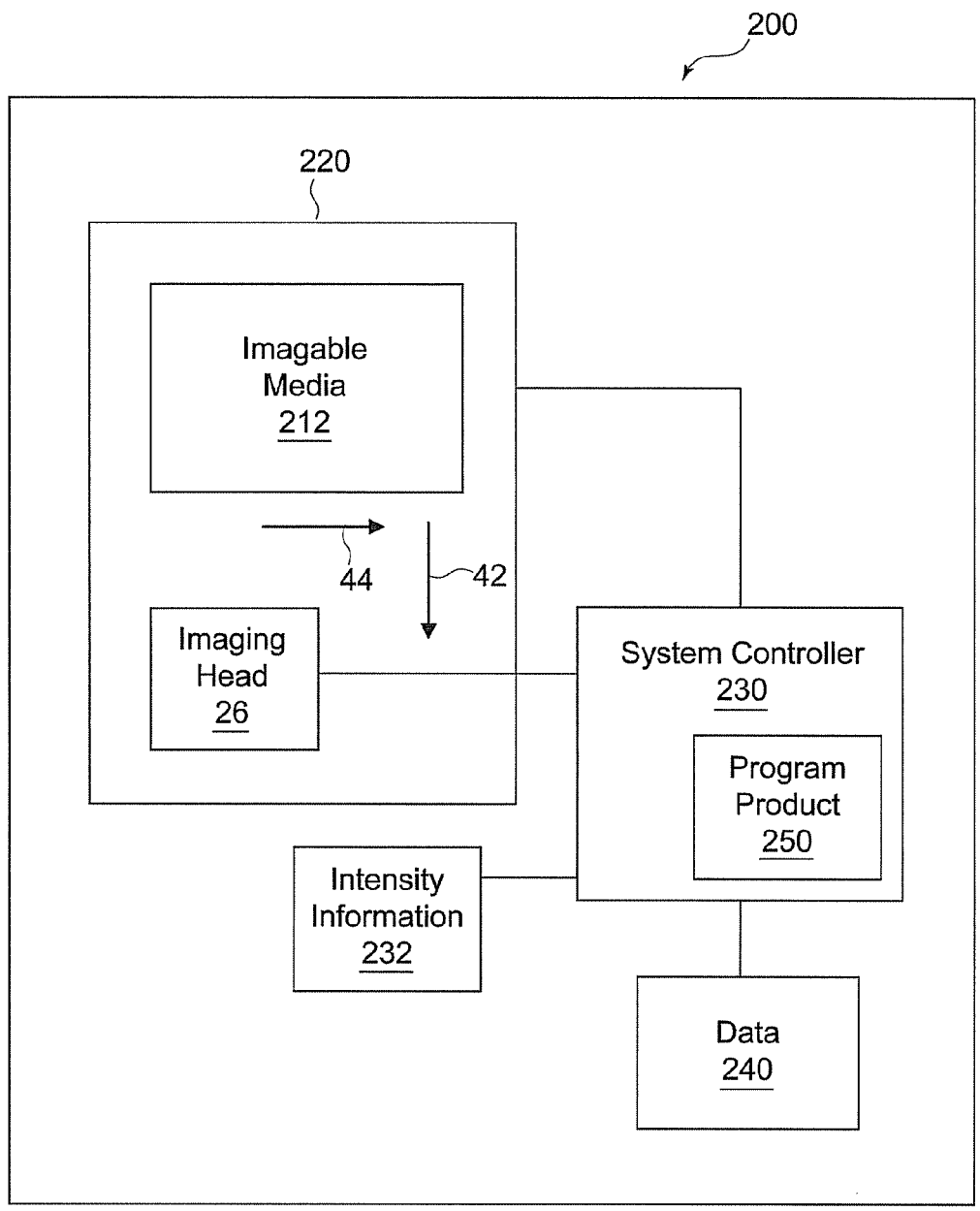
FIG. 11 is a system according to an example embodiment of the invention.

FIG. 11 schematically shows an imaging system 200 according to an example embodiment of the invention. System 200 includes a multi-channel imaging head 26, a translation unit 220 that establishes relative motion between an imageable media 212 and imaging head 26 during the imaging of the imageable media 212 by imaging head 26. This relative motion can be along a sub-scan direction 44 and/or a main scan direction 42 associated with the imaging. Relative motion along sub-scan direction 44 between imaging head 26 and imageable media 212 may or may not occur between each successive scan of imaging head 26.

Imaging head 26 may comprise any suitable multi-channel imaging head having individually-addressable channels, each channel capable of producing an imaging beam having an intensity that can be controlled. Imaging head 26 may provide a one-dimensional or two-dimensional array of imaging channels. Any suitable mechanism may be used to generate imaging beams. The imaging beams may be arranged in any suitable way.

Some embodiments of the invention employ infrared lasers. Infrared diode laser arrays employing 150 μm emitters with total power output of around 50 W at a wavelength of 830 nm, have been successfully used in the present invention. Alternative lasers including visible light lasers may also be used in practicing the invention. The choice of laser source employed may be motivated by the properties of the media to be imaged.

Imageable media 212 can include a donor element 24 and a receiver element 18 (both not shown). System 200 also includes systems controller 230. Controller 230 may include a micro-computer, micro-processor, micro-controller or any other suitable arrangement of electrical, electromechanical and electro-optical circuits and systems that can reliably transmit signals to multi-channel imaging head 26 and translation unit 220 to image media 212 in accordance with various data inputs to controller 230. Controller 230 may include a single controller or a plurality of controllers.

As shown in FIG. 11, data 240 representing a pattern 50 of features 51 (not shown in FIG. 11) is input to system controller 230. Without limitation, pattern 50 may represent a pattern of color features forming a portion of a color filter.

A program product 250 can be used by systems controller 230 to perform various functions required by system 200. One function includes setting control parameters for imaging head 26 to reduce edge discontinuities in the features 51 of pattern 50 as described herein. Without limitation, program product 250 may comprise any medium which carries a set of computer-readable signals comprising instructions which, when executed by a computer processor, cause the computer processor to execute a method as described herein. The program product 250 may be in any of a wide variety of forms. The program product 250 may comprise, for example, physical media such as magnetic storage media including floppy diskettes, hard disk drives, optical data storage media including CD ROMs, DVDs, electronic data storage media including ROMs, flash RAM, or the like. The instructions may optionally be compressed and/or encrypted on the medium.

In one example embodiment of the invention, program product 250 configures systems controller 230 to analyze data 240 to identify a particular groups 48 of channels 40 to be used to image a given feature 51. Systems controller 230 also selects sub-groups 54' and 54" to be used to image edge portions of the feature 51. The identification of groups 48, and sub-groups 54', 54" and 58 may be performed automatically by systems controller 230. In the alternative, or additionally, controller 230 may permit manual selection of channel groups 48 (including sub-groups 54', 54" and 58) under the guidance of an operator communicating with systems controller 230 through an appropriate user interface.

Controller 230 sets control parameters including parameters that set the intensities for channels in sub-groups 54' and 54" and channels in interior sub-group 58. The intensities are selected to be at least equal to $I_{thresh}$ associated with the donor element 24 being imaged. The intensity for each channel is determined based upon whether or not the channel is in an edge sub-group 54. In some cases, the intensity is additionally determined based upon other factors such as:

where the channel is in imaging head 26 (e.g. what is the channel number);

which edge sub-group (54' or 54") is the channel in;

if the sub-group includes more than one channel, where is the channel located within the sub-group;

the size and position of the feature 51 being imaged within pattern 50;

the sequence of imaging of different donor elements; and, additional considerations.

The intensities may be set automatically by controller 230 based on some or all of the factors above. Determination of the channel control parameters can be made on the basis of suitable algorithms and/or data inputted to controller 230, or programmed within program product 250. The control parameters may be determined in advance of imaging or may be determined "on the fly" as imaging progresses.

In the alternative, or additionally, controller 230 may permit manual tuning of channel intensities under the guidance of an operator communicating with systems controller 230 through an appropriate user interface.

In some embodiments, controller 230 maintains intensity information 232 that specifies an intensity (or, equivalently, an amount of boost in intensity) for each channel 40 of an imaging head 26. The intensity information may vary across the channels of imaging head 26. If a channel is determined to fall within an edge sub-group 54' or 54" for a particular feature 51 (i.e. where that channel 40 will image an edge portion of the feature), controller 230 may automatically set the intensity for the channel to the value specified by the intensity information.

In some embodiments, controller 230 maintains separate intensity information for home-side edge sub-group 54' and away-side edge sub-group 54". In such embodiments, controller 230 determines whether a channel is in one of sub-groups 54' and 54". If so, controller 230 retrieves the intensity information appropriate to that sub-group and channel and sets the intensity of the channel according to the intensity information.

Controller 230 then operates imaging head 26 and translation unit 220 to image media 212 using the intensity as determined for each channel. In some embodiments, the intensity of channels in at least one of (and in some embodiments both of) edge sub-groups 54' and 54" that image edge portions along edges 56' and 56" of a feature 51 exceeds the intensity of channels in interior sub group 56 of the same feature 51 by at least 3%.

For the methods described herein it is convenient when features 51 have the form of stripes that have edges extending parallel to main scan direction 42. The stripes may be continuous or interrupted. In such cases, the edge portions of the features are imaged by the same channels 40 all along the features. It is particularly convenient when several such stripe features can be imaged in a single swath of imaging head 26. The invention is not limited to imaging stripes, however.

In some example embodiments of the invention a feature 51 is imaged during one or more scans of imaging head 26. A feature 51 may be contiguous or non-contiguous with another feature.

Features 51 may be imaged in accordance with image data that includes halftone screening data. In halftone imaging, features comprise halftone dots. The halftone dots vary in size according to the desired lightness or darkness of the imaged feature. Each halftone dot is typically larger than pixels imaged by imaging head 26 and is typically made up of a matrix of pixels imaged by a plurality of imaging channels. Halftone dots are typically imaged at a chosen screen ruling typically defined by the number of halftone dots per unit length and a chosen screen angle typically defined by an angle at which the halftone dots are oriented. In example embodiments of the invention, a feature 51 may be imaged with a screen density in accordance with the corresponding halftone screen data chosen to image that feature.

In other example embodiments of the invention, a feature 51 may be imaged with stochastic screen made up of a varying spatial frequency of equally sized dots. In yet other example embodiments of the invention, a non-contiguous feature may be imaged with a combined halftone and stochastic screen (commonly referred to as a "hybrid" screen).

While the invention has been described using as examples applications in display and electronic device fabrication, the methods described herein are directly applicable to imaging any patterns of features including those used in biomedical imaging for lab-on-a-chip (LOC) fabrication. LOC devices may include several repeating patterns of features. The invention may have application to other technologies, such as medical, printing and electronic fabrication technologies.

It is to be understood that the exemplary embodiments are merely illustrative of the present invention and that many variations of the above-described embodiments can be devised by one skilled in the art without departing from the scope of the invention.

What is claimed is:

1. A method for imaging a feature by laser-induced thermal transfer, the method comprising:
   on a substrate comprising a donor element and a receiver element, scanning a plurality of independently-controllable light beams in a scan direction along corresponding scan lines, each light beam operable for forming a corresponding image pixel on the receiver element;
   imaging a feature by operating a contiguous group of the beams to transfer an image-forming material from the donor element to the receiver element; and,
   while imaging the feature, controlling intensities of a first edge sub-group of one or more of the beams corresponding to a first portion of the feature extending along a first edge of the feature and a second edge sub-group of one or more of the beams corresponding to a second portion of the feature extending along a second edge of the feature to have intensities different from intensities of an interior sub-group of one or more of the beams corresponding to an interior portion of the feature.

2. A method according to claim 1 comprising setting the intensities of the beams of at least one of the first and second edge sub-groups to exceed the intensities of at least some of the beams of the interior sub-group by 3% or more.

3. A method according to claim 1 comprising setting the intensities of the beams of the first edge sub-group differently from the intensities of the beams of the second edge sub-group.

4. A method according claim 1 comprising setting intensities of the group of the beams to provide an intensity profile that is asymmetrical across the feature.

5. A method according to claim 4 comprising setting intensities of the beams of the interior sub-group to provide an asymmetrical intensity profile in the interior portion of the feature.

6. A method according to claim 1 comprising:
   maintaining intensity information associated with each of the beams, the intensity information specifying an intensity to set for the beam in the event that the beam is in one of the first and second edge sub groups for any feature;
   determining which beams are in the first edge sub-group for the feature; and,
   setting intensities of the beams of the first edge sub-group according to the intensity information corresponding to the beams.

7. A method according to claim 1 comprising:
   maintaining first intensity information associated with each of the beams, the first intensity information specifying an intensity to set for the beam if the beam is in the first edge sub group for any feature;
   maintaining second intensity information associated with each of the beams, the second intensity information specifying an intensity to set for the beam if the beam is in the second edge sub group for any feature;
   determining which beams are in the first edge sub-group for the feature;
   setting intensities of the beams of the first edge sub-group according to the first intensity information corresponding to the beams;
   determining which beams are in the second edge sub-group for the feature; and,
   setting intensities of the beams of the second edge sub-group according to the second intensity information corresponding to the beams.

8. A method for forming a feature on a receiver element, the feature comprising a first edge portion and a second edge portion, the method comprising:
   operating an imaging head comprising a plurality of individually-addressable channels to direct light beams corresponding to the channels to scan along corresponding scan paths on a donor element and to transfer material from the donor element to the receiver element by a laser-induced thermal transfer process while controlling intensities of the beams corresponding to the channels so that beams corresponding to a first edge portion of the feature operate at a first intensity and beams corresponding to a second edge portion of the feature operate at a second intensity different from the first intensity.

9. A method according to claim 8, comprising operating beams corresponding to an interior portion of the feature at a third intensity that is different from at least one of the first and second intensities.

10. A method according to claim 9 wherein the third intensity is different from both of the first and second intensities.

11. A method according to claim 9 wherein the third intensity is lower than at least one of the first and second intensities.

12. A method according to claim 11, wherein the third intensity is at least 3% lower than at least one of the first and second intensities.

13. A method according to claim 8, wherein the first edge portion and second edge portion are spatially separated from one another in a sub-scan direction.

14. A method according to claim 8, wherein the feature comprises a stripe that is continuous in a direction parallel to the scan paths.

15. A method according to claim 8, wherein the feature comprises a stripe that is interrupted in a direction parallel to the scan paths.

16. A method according to claim 8 wherein the feature is one feature of a pattern comprising a plurality of features and the method comprises operating the imaging head to form simultaneously the feature and at least one other feature of the pattern.

17. A method according to claim 16 wherein the first edge portion corresponds to a home edge of the feature, and the method comprises setting intensities of the beams corresponding to the home edge portion of the feature to be different from intensities of the beams corresponding to a home edge portion of the at least one other feature.

18. A method according to claim 16 wherein the second edge portion corresponds to an away edge of the feature and the method comprises setting intensities of the beams corresponding to the away edge portion of the feature to be different from intensities of the beams corresponding to an away edge portion of the at least one other feature.

19. A method according to claim 16, comprising setting intensities of the channels corresponding to first and second edge portions of the at least one other feature to be different from the intensities set for the channels corresponding to the first and second edge portions of the feature.

20. A method according to claim 16 wherein the pattern of features is a repeating pattern.

21. A method according to claim 20, wherein the pattern of features is a repeating pattern of stripes extending parallel to the scan paths.

22. A method according to claim 16 wherein the pattern of features comprises a pattern of color features forming a portion of a color filter.

23. A method for forming a plurality of features, the method comprising:
   advancing an imaging head relative to a receiver element along a scan path to transfer the plurality of features from a donor element to the receiver element by a laser-induced thermal transfer process, the imaging head comprising a light valve operable to control individually a plurality of light beams, each light beam capable of transferring an image-forming material from the donor element to the receiver element; and
   operating the light valve to control the plurality of beams wherein beams that transfer edge portions of a feature have intensities different from beams that transfer interior portions of the feature.

24. A method according to claim 23, comprising modulating the plurality of beams to transfer interior portions of the feature with light beams of lower intensity than the light beams used to transfer the edge portions of the feature.

25. A method for forming a plurality of features by a laser-induced thermal transfer process, the method comprising:
   advancing an imaging head relative to a receiver element along a scan path to transfer the plurality of features from a donor element to the receiver element, the imaging head comprising an array of adjacently-positioned imaging channels, each imaging channel operable for forming an individually-controllable light beam, each light beam capable of transferring an image-forming material from the donor element to the receiver element; and
   operating the imaging head to selectively modulate each beam wherein edge portions of each feature are transferred with light beams of varying energy intensities.

26. A method for forming a feature by a laser-induced thermal transfer process, the method comprising:
   advancing an imaging head relative to a receiver element along a scan path; and
   controlling the imaging head to form a plurality of light beams with an asymmetrical intensity profile to form the feature by transferring an image-forming material from a donor element to a receiver element.

27. A method according to claim 26, comprising controlling the imaging head to selectively modulate the plurality of light beams to transfer edge portions of the feature with light beams of varying intensities.

28. A method for forming a plurality of features by a laser-induced thermal transfer process, the method comprising:
   advancing an imaging head relative to a receiver element along a scan path to transfer the plurality of features from a donor element to the receiver element, and
   controlling the imaging head to transfer a first feature from the donor element to the receiver element with a first plurality of imaging beams; and to transfer a second feature from the donor element to the receiver element with a second plurality of imaging beams; wherein the first plurality of imaging beams and the second plurality of imaging beams have different intensity profiles.

29. A program product carrying a set of computer-readable signals comprising instructions which, when executed by a systems controller, cause the systems controller to:
   operate an imaging head comprising a plurality of individually-controllable channels to transfer along a scan path one or more features from a donor element to a receiver element in a laser-induced thermal transfer process; and
   selectively activate channels of the plurality of individually-controllable channels to transfer a first edge portion of the one or more features at a first intensity and a second edge portion of the one or more features at a second intensity, the second intensity being different from the first intensity.

* * * * *